United States Patent [19]

Roth et al.

[11] Patent Number: 4,461,645
[45] Date of Patent: Jul. 24, 1984

[54] METHOD OF AND APPARATUS FOR THE COOLING OF WHITE CEMENT CLINKER

[75] Inventors: Gunter Roth, Munich; Wolfram Quittkat, Gauting; Dieter Frank, Munich; Ludwig Muller, Germering; Wilhelm Grassmann, Munich, all of Fed. Rep. of Germany

[73] Assignee: BKMI Industrieanlagen GmbH, Munich, Fed. Rep. of Germany

[21] Appl. No.: 381,738

[22] Filed: May 24, 1982

[30] Foreign Application Priority Data

May 23, 1981 [DE] Fed. Rep. of Germany ....... 3120383

[51] Int. Cl.³ .............................................. C04B 7/50
[52] U.S. Cl. .................................... 106/100; 106/101; 106/102; 432/117
[58] Field of Search ....................... 106/100, 101, 102; 432/117

[56] References Cited

U.S. PATENT DOCUMENTS

| 3,799,785 | 3/1974 | Tanner | 106/101 |
| 4,059,396 | 11/1977 | Dano | 106/101 |
| 4,101,337 | 7/1978 | Dano | 106/101 |

FOREIGN PATENT DOCUMENTS

| 1178769 | 9/1964 | Fed. Rep. of Germany | 106/100 |
| 1942537 | 3/1971 | Fed. Rep. of Germany | 106/100 |
| 2544343 | 4/1976 | Fed. Rep. of Germany | 106/100 |
| 2813325 | 10/1978 | Fed. Rep. of Germany | 106/100 |
| 1301758 | 1/1973 | United Kingdom | 106/100 |

OTHER PUBLICATIONS

Article entitled "Einfluss der Ofenatmosphäre beim Brennen von Zementklinker", by H.-M. Syllarin Publication, Zement-Kalk-Gips, No. 6, 1978.
Zement-Kalk-Gips 6/78, pp. 291 through 293.

Primary Examiner—James Poer
Attorney, Agent, or Firm—Karl F. Ross; Herbert Dubno

[57] ABSTRACT

A method of and an apparatus for cooling white cement clinker from a rotary kiln wherein the clinker is classified into at least two and preferably more particle-size fractions which are quenched with water with residence times staggered so as to increase as the particle size range increases. The cooling is effected to a temperature of below 1200° C. but without excessively cooling the clinker so that all fractions retain sufficient sensible heat to drive off water picked up during the quenching process and resulting in completely dry clinker.

12 Claims, 2 Drawing Figures

METHOD OF AND APPARATUS FOR THE COOLING OF WHITE CEMENT CLINKER

FIELD OF THE INVENTION

The present invention relates to a method of and to an apparatus for the cooling of white cement clinker which is formed by high temperature sintering in a rotary kiln or cement-firing furnace resulting in sintering of the particles together. More particularly, the invention relates to the water-quenching of white cement clinker which is produced at a high temperature and serves as a carrier of sintering heat, the quenching cooling the clinker to a temperature below 1200° C.

BACKGROUND OF THE INVENTION

White cement clinker, like the usual Portland cement clinker, is formed by burning a mixture of solids in a rotary kiln or furnace to sinter the particles together. Unlike Portland cement, however, the cooling of white cement clinker requires special care to avoid any deterioration of the degree of whiteness of the product.

In German patent document (printed application) No. 1,942,537 for example, for a given composition, a cooling duration of 1.5 to 6 minutes is prescribed to bring the temperature to 700° to 1000° C. whereupon rapid cooling is carried out under a reducing atmosphere to about 300° C. by spraying with water.

In the process described in German Pat. No. 1,178,769 a fuel is sprayed upon the clinker to function as a reducing agent and directly thereafter the product is quenched by spraying the clinker within the outlet of the rotary furnace with water.

German patent document (open application) 28 13 325 directs the predominant proportion of the fuel as a stream directly upon the growing clinker. Recent investigations (see Zement-Kalk-Gips 6/78, pages 291 through 293) have shown that it is important to carry out the first cooling phase rapidly to a temperature of about 1200° C. under a reducing atmosphere to avoid coloration of the product. It has also been found that only with this cooling approach is it possible to prevent loss in strength of the cement when the latter is ultimately used, such loss of strength characterizing complete cooling of clinker in water.

Other tests have demonstrated that the superficial treatment of the clinker with water can only avoid coloration if the clinker is in a finely divided form, i.e. has been previously converted to small granules.

If granulation is not effective to produce a product of a sufficiently small particle size, internal portions remain unquenched and develop a brown color which adversely affects the milled product.

Even if granules of a diameter of 15 mm or more are cooled by superficial spraying, for example, it is found that core portions remain sufficiently hot and cool at such a low rate that a brownish color agent develops.

It is thus common in the cooling of white cement clinker to convey the latter from the sintering zone into a water bath and to allow the clinker to fully cool by immersion therein.

This, of course, has disadvantages with respect to the thermal economy of the process because the residual heat of the clinker is completely lost, thereby increasing the thermal demand of the process by 20 to 30%.

Another disadvantage is that the period between leaving the sintering zone to entering the bath may require several minutes over which the clinker can cool through several hundred degrees and a portion of the divalent iron is oxidized. This, of course, results in a loss of whiteness.

Still others (see German patent documents - open applications Nos. 11 78 325 and 28 13 325) have suggested the quenching of the clinker in the rotary kiln as soon as the clinker emerges from the sintering zone with water in sufficient quantities that the small granules pick up some moisture, i.e. are practically completely cooled, whereas the large granules and chunks remain hot at their cores. A cooling drum is then provided downstream of the rotary furnace in which temperature equalization can be effected so that the residual heat suffices to vaporize all of the moisture pick-up by the clinker. This residual heat, therefore, is not available to heat the combustion air drawn through the drum into the oven.

These techniques may sufficiently quench only the fine granules, generate water vapor which must be drawn through the furnace and detrimentally affects the heat balance thereof, and may not satisfactorily cool the larger pieces of clinker. Consequently, the larger portion of the granulate and the chunks must be removed so as to prevent any detrimental effect upon the degree of whiteness of the cement.

These systems also reduce the strength of the cement.

OBJECTS OF THE INVENTION

It is the principal object of the present invention, therefore, to provide a process for producing cement clinker of the highest possible degree of whiteness without significant reduction in the strength or coherency of the clinker and without significant heat loss.

Another object of this invention is to improve the heat economy in the cooling of white cement clinker.

Yet a further object of this invention is to provide a method of and an apparatus for the cooling of white cement clinker whereby disadvantages of earlier systems are obviated, the heat loss from the system is reduced and the quality of the product is enhanced.

SUMMARY OF THE INVENTION

These objects and others which will become apparent hereinafter are attained, in accordance with the invention, in the cooling of white cement clinker which is formed in a rotary kiln furnace fired by a main burner at an end of the oven and which generates sintering heat transmitted to the white cement clinker and raising the temperature thereof to well above 1200° C., the method comprising passing the white cement clinker at the elevated temperature rapidly through the rotary furnace beyond the sintering zone so that its residence time in the rotary furnace beyond this zone is held to be comparatively short, classifying the clinker into at least two particle-size classes and controlling the durations of cooling of the two classes as they are quenched in a water bath so that the duration is stepped such that the granules contain only sufficient residual heat for the drying of the clinker.

The quenching of the clinker in the water bath should be such that temperature is dropped practically instantaneously to a level below 1200° C.

The quenching of the clinker directly after it leaves the sintering zone thus eliminates the tendency for the sintering zone to be cooled by water vapor and, under the conditions described, the clinker which is recovered will be completely dry. Unnecessary cooling, i.e. cooling once the temperature is below 1200° C., is avoided.

By the immediate quenching of the classified granules in a time-staggered manner as they leave the sintering zone, the temperature gradient to which the particles are subjected from the sintering zone until the particles are discharged from the quenching chamber is comparatively steep so that all sizes of the particles are brought to the temperature below 1200° C. sufficiently rapidly that discoloration of the ground clinker will not result and yet there is sufficient residual heat that this residual heat can dry the clinker and produce a high quality dry product ready for grinding.

The method of the invention has a number of advantages. For example, the high speed transfer of the clinker from the sintering zone to the water bath occurs under a water vapor atmosphere without significant cooling during the transfer thereby excluding divalent iron ($Fe^{2+}$) oxidation and assuring a maximum degree of whiteness in the product.

Because of the classification of the granules into at least two particle-size classes and by controlling the duration of cooling thereof so that sufficient residual heat remains in both classes (or in any additional classes into which the particles may be classified), it is possible that the approximately 500 kJ/kg Kl which can remain after drying can be utilized effectively for secondary air heating and thus be contributed to the burning process.

This results in both a qualitative improvement and an improvement in the thermal economy of the system.

According to the apparatus aspects of the invention, the discharge end of the rotary furnace is provided with means for classifying the clinker into at least two and preferably three particle-size categories, with the larger clinker possibly being ground or otherwise comminuted to reduce its size, the clinker from the separate classifications being introduced into the water bath at time-spaced intervals, whereby the various classes are quenched for different periods of time calculated to drop the temperature below 1200° C. but not to cool the particles significantly below this temperature within the water bath. Means is provided for removing the particles from the water bath and thus regaining sufficient heat in the particles of all of the classes to vaporize any moisture picked up by the clinker and yet provide sufficient residual heat to vaporize the balance and additional heat which is contributed to the burning process by heating the secondary combustion air.

This can be achieved effectively by providing at a distance of about half the diameter of the rotary furnace, from the discharge end of the latter, a plurality of peripheral outlets preferably in a peripheral array, opening into a shaft which collects the respective class of particles, the axial length of the discharge gap being less than 200, preferably less than 100, mm and its width between 10 and 30 mm.

With this dimensioning, the large pieces of clinker can pass over the outlet gap to the very end of the furnace while the fine granules can pass through the gap and are collected to be deposited at the discharge side of the water bath. The water bath, in turn, may have a progressively increasing depth in the direction of movement of the clinker toward the end of the rotary kiln and can be provided with a clinker-removal conveyor which runs in the opposite direction and can be inclined upwardly to deposit the clinker extracted from the bath in a trough or the like.

Consequently, the fine clinker passing through the discharge gap previously described can fall onto this conveyor after traversing a minimum depth of the water bath with which it is in contact only for a brief period before it is moved by the conveyor and discharged from the water bath.

Larger particles meet the conveyor further upstream and thus cascade through a greater depth of the quenching bath and are displaced by the conveyor over a longer path through the latter.

Dimensioning of the discharge gap in the manner described ensures that only the particles whose size does not exceed the width of the discharge gap can leave through this gap.

Because the discharge gap is provided on a rotary portion of the kiln or oven, there is little tendency for the discharge gap to be plugged or blocked by the granules.

We have found it to be advantageous, moreover, to provide the discharge end of the rotary kiln or furnace with an outwardly open funnel-like frustoconical shape beyond the aforementioned discharge gap, this discharge funnel having an axial length which can be between ½ and 1 diameter of the rotary furnace.

The granules and chunks of the clinker which jump over the discharge gap are discharged over the downstream edge of this funnel-shaped member, and because of the frustoconical divergence in the direction of this edge, are accelerated in their discharge from the oven and can be subjected to further classification.

The water bath of progressively increasing depth can be formed by a trough disposed below a screen for the further classification of the white cement clinker, the floor of this trough rising to parallel the inclined path of the conveyor.

From the discharge gap, the shaft through which the clinkers pass can fall to a shallow portion of the water bath while the larger particles passing the grid or screen can fall through a deeper portion of the water bath.

In the path of the particles from the aforementioned shaft or from wherever the particle streams are induced to cascade toward the water bath, impingement surfaces or baffles can be provided, preferably with inclined upper surfaces so that the larger particles are deflected by the baffles further downstream along the conveyor path to the water bath. The resulting ballistic classification further ensures that the larger particles will have a longer residence time than the smaller particles. The largest particles which enter the water bath at its deepest end may be reduced by a comminuting or grating device which breaks them up to ensure that the residence time will be effective to provide thorough cooling and prevent discoloration of the cores.

One or more of the baffling elements can be provided as a classifying grate, preferably a grate which is inclined and may be parallel to the conveyor for removing the clinker from the water bath.

Because of the frustoconical discharge end of the oven, larger clinker granules and chunks are discharged within seconds from the oven and permitted to fall freely into the water trough or to pass along the classification grate to the breaker or comminuter from which they, in turn, descend freely into the water trough.

The frustoconical outlet of the rotary kiln rapidly discharges the large clinker granules and chunks within seconds from the oven and causes them to fall either directly in a free fall or with deflection in a ballistic parabolic path to deeper parts of the water bath while the finer particles which traverse the gap or enter the water bath at further upstream locations with respect to movement of the particles from the kiln, enter the water bath at locations such that the residence time in the water bath is graded with respect to the particle size and the particles of larger size remain in contact with the water bath for longer periods.

In other words, the residence time and hence the duration of contact of the particles with the water is controlled in accordance with particle size by three distinct operations.

Firstly, since the smaller particles enter the water bath closer to the point at which the cooled particles are extracted therefrom, they remain in the water bath for a shorter period of time.

Secondly, because the larger particles cascade through a greater depth of water, even apart from the fact that they enter at a location more distinctly from the discharge point, they are in contact with the water bath for a longer period.

Finally, because the larger particles pass through a greater depth of water and are displaced on the longer path to the water, their residence time in the bath is greater.

The residence time can be readily controlled by varying the depth of water speed of the conveyor which extracts the clinker from the water bath.

For example, if the water level is lowered and the transport speed increased to reduce the residence time in the bath as may be required when even the larger particles can be readily cooled to a temperature of below 1200° C., it may not even be necessary to effect immersion of the smaller particles. In this case, the smaller particles in cascading onto a portion of the conveyor which has emerged from the bath, can be contacted with water from spray nozzles or the like.

Naturally, when the conveyor operates at a higher velocity, the particles upon extraction from the bath may retain sufficient sensible heat to heat the larger quantities of secondary air if this is advantageous.

In practice the heat saving can be determined by utilizing a loss multiplier of 1.4 to 130 kJ/kgKl which can allow a 10% recovery of the total thermal consumption in the form of the recovery of sensible heat from the clinker for secondary air heating:

| | | |
|---|---|---|
| Of fine granules | 0.7.(600–200).0.23 = | 65 kcal/kgKl |
| of average granules | 0.2.(700–200).0.23 = | 23 kcal/kgKl |
| of large granules and chunks | 0.1.(400–200).0.23 = | 5 kcal/kgKl |
| Total | | 92 kcal/kgKl |
| fuel saving | 1.4 × 92 = | 129 kcal/kgKl |
| | = | 500 kJ/kgKl |

Apart from such important economics, it is found that the low residence time of the clinker in the water bath results, once the clinker is extracted, in a substantially dry clinker and eliminates the possibility of deterioration of the clinker. The clinker can thus be readily ground and the ground product has an improved degree of whiteness since discoloration cannot occur.

It has been found to be advantageous, however, to operate with an extremely short sharp main flame of the main burner to guarantee a sharp temperature increase at the end of the rotary kiln or furnace from which the product is discharged. This has scarcely been possible heretofore in conventional systems and we have found that it is possible to permit the main flame to be relatively short while not creating a disadvantageous thermal gradient when the preheated secondary air is supplied not to the main burner but to a combustion chamber or to one or more small auxiliary burners in the end wall at the head of the open air furnace so that the temperature in this region, even rearwardly of the main burner, can be maintained significantly above 700° C. At least one third of the total fuel can be consumed at these auxiliary burners.

BRIEF DESCRIPTION OF THE DRAWING

The above and other objects, features and advantages of the present invention will become more readily apparent hereinafter with reference to the following description dealing with an apparatus for carrying out the present invention and diagrammatically illustrated in the accompanying drawing in which.

SPECIFIC DESCRIPTION

Figure 1:
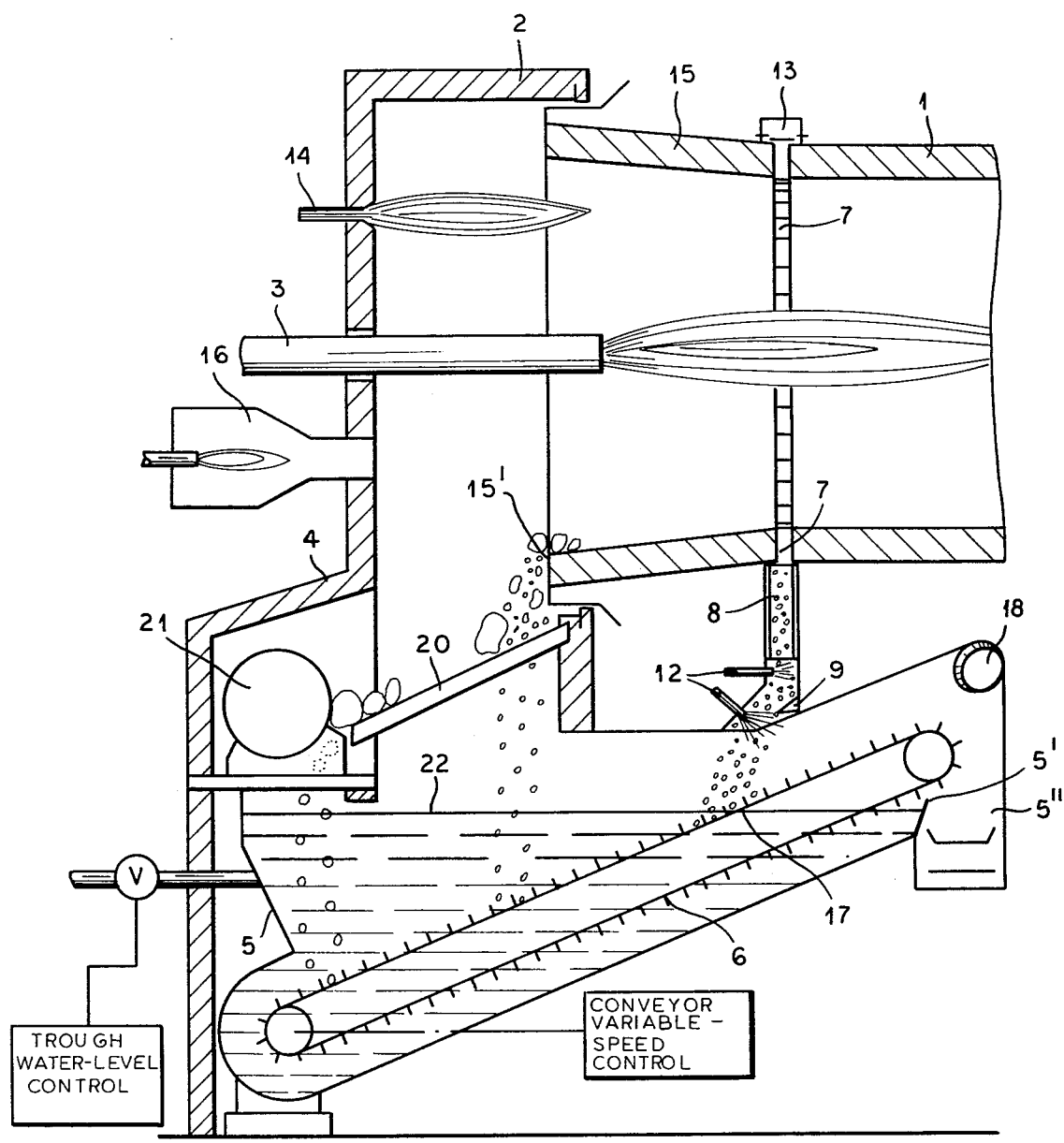
FIG. 1 is an axial section through the furnace head of a rotary kiln furnace according to the invention.

FIG. 1 shows a rotary oven or kiln 1 having an oven head 2 at the discharge end thereof provided with a main burner 3 centrally therein.

The oven head 2 is provided with a downwardly open shaft within which an upwardly open water trough 5 is positioned. This trough is oriented so that it rises from left to right, i. e. in the direction opposite the direction of movement of the clinker out of and through the rotary kiln.

Within the water trough 5 a conveyor 6 is provided, the upper path of the conveyor receiving the water-cooled clinker and carrying it over the discharge edge 5' of the trough into a drying chamber.

Above this conveyor a grate 20 is provided which serves as a classifier and as a protective member preventing massive large chunks of clinker from falling heavily upon the conveyor. These large chunks are led by the grate 20 to a breaker or mill 21 where they are comminuted into smaller pieces and fall into the trough at the lower end of the conveyor 6.

The finely divided clinker cascades through the shaft 8 into the water trough 5 toward the upper end of the conveyor 6 and can be deflected by a baffle 9 which imparts a horizontal component to the movement of the granules so that the heavier granules fall into the still deeper portions of trough than the finer granules.

The secondary air is burnt in part by an auxiliary burner 14 and in part by a hot gas generator in the form of a combustion chamber, the secondary gas being drawn from the compartment 5' into which the dry clinker passes and which has not been shown in any detail. The mist, vapor and the like are drawn off at the outlet 18.

The large granules and chunks of the clinker jump over the discharge gap 7 and are accelerated downwardly by a frustoconical divergence 15 of the outlet side of the rotary kiln at the discharge edge 15'.

The water level 22 can be raised or lowered to control the residence time of the various classes of clinker in the water bath.

When, for example, the residence time of the larger pieces of clinker must be reduced so that the smaller pieces of clinker cascade at 17 onto the conveyor 6 without immersion in the water bath, nozzles 12 are provided to spray the smaller particles of clinker with water to quench them at a temperature below 1200° C. whereupon they are carried by the conveyor 6 over the edge of the water trough 5.

Except for its lower portion, where the annular discharge slot 7, which can be formed as a gap, communicates with the shaft 8, this gap is covered by a head 13.

The vapor outlet 18 is disposed over the upper part of the conveyor 6.

Figure 2:
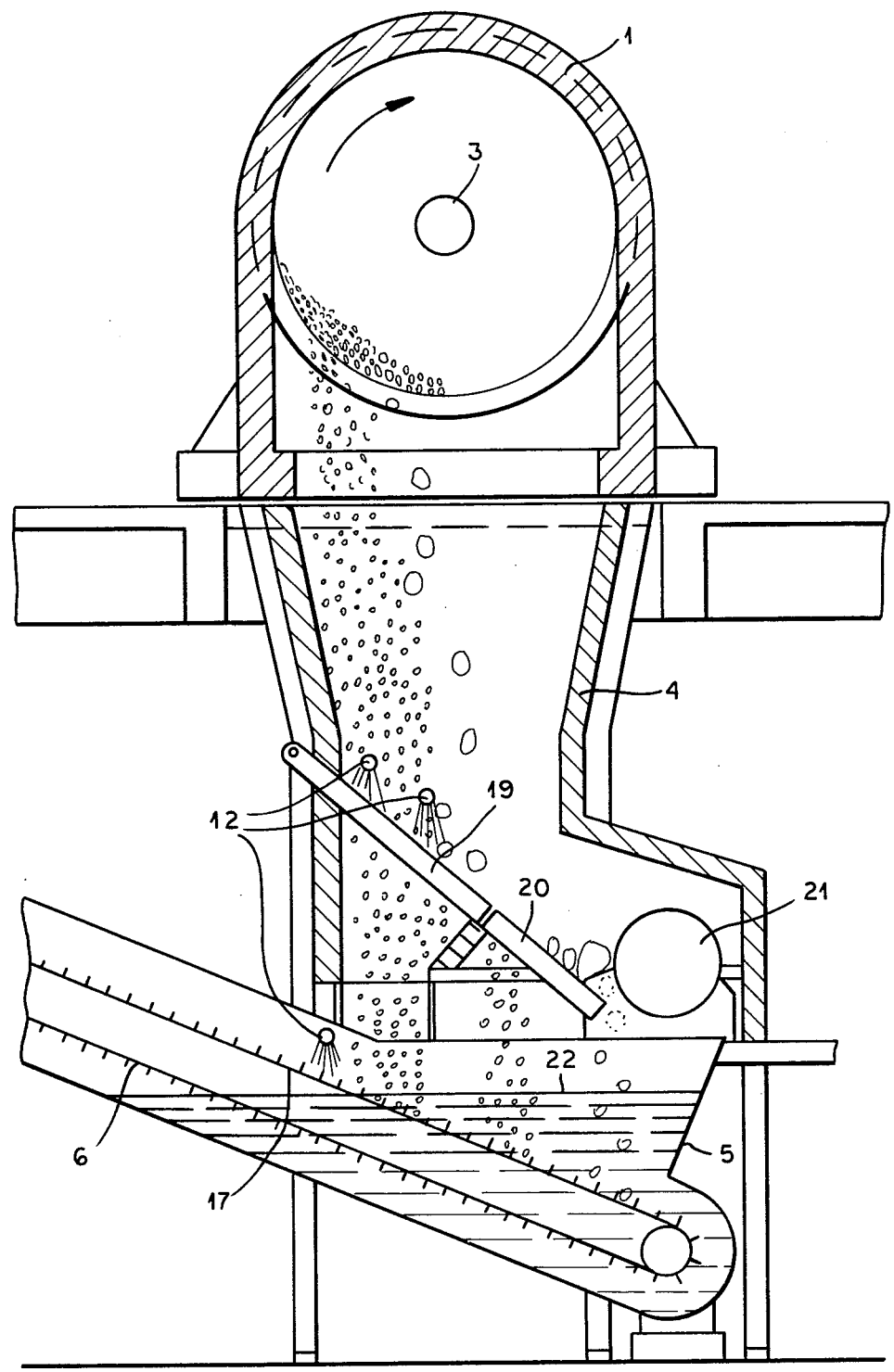
FIG. 2 is a transverse section through a rotary kiln furnace in accordance with another embodiment thereof.

In the embodiment of FIG. 2, the classification grate 20 extends transversely as does the conveyor 6 and the water trough 5, the grate 20 being disposed in a plane with the baffle element 19 having passages through which the particles can pass. In this embodiment, the trough at 9 passes particles of one size range, the grate 20 passes particles of the second size range and the breaker 21 forms particles of a third size range, each range falling progressively through deeper levels of water and having a greater residence time in the water trough. Nozzles 12 are provided for additional rapid cooling.

In operation, of course, both embodiments act similarly.

White cement clinker is produced in the conveyor 6 and is fueled in the rotary kiln primarily with the heat generated by the main burner which delivers its flame through the outlet end of the kiln, the latter being inclinded outwardly from this discharge end or head.

As the solids move downwardly and are tumbled in the kiln (see FIG. 2) which is rotary by conventional means not shown, the clinker if formed by sintering at a temperature well above 1200° C.

At the discharge end, without any significant delay, the clinker is classified into at least two particle-size fractions which are water-quenched to temperatures below 1200° C. at different residence times in contact with the water and are removed from contact with the water bath while retaining sufficient sensible heat to evaporate any moisture picked up by the clinker as it is quenched.

We claim:

1. A method of making white cement clinker, comprising the steps of:
    burning white cement clinker solids in a rotary kiln to sinter said solids into white cement clinker at a sinter zone proximal to a discharge end of said kiln at a temperature substantially above 1200° C.;
    classifying said clinker immediately upon its emergence from said zone into at least two particle size fractions;
    quenching each of said particle size fractions with water immediately upon the classification of said clinker into said fractions at a temperature below 1200° C.;
    maintaining each of said particle size fractions in contact with the quenching water for residence time determined by the particle size fraction; and
    terminating the contact of said clinker with quenching water prior to complete cooling of the clinker whereby said fractions retain sufficient sensible heat to drive moisture therefrom.

2. An apparatus for producing white cement clinker comprising:
    a rotary kiln traversed by white cement clinker forming solids to a discharge end of the kiln;
    a main burner opening into said kiln at said discharge end for burning said solids to form a sintered white cement clinker at a temperature substantially in excess of 1200° C. at a sinter zone proximal to said discharge end;
    classifying means directly adjacent said sintering zone for classifying said clinker into at least two particle-size fractions; and
    means for quenching each of said fractions with water for respective residence times determined by the particle size thereof to a temperature below 1200° C. but such that said fractions retain sufficient sensible heat to drive residual moisture therefrom and dry the cooled clinker.

3. The apparatus defind in claim 2 wherein said classifying means includes a plurality of discharge gaps arranged peripherally around said kiln at a distance from said discharge end equal substantially to half the diameter of said kiln and a shaft communicating with said gaps for allowing said clinker to cascade downwardly therethrough.

4. The apparatus defined in claim 3 wherein said gaps have axial lengths less than 200 mm and widths of 10 to 30 mm.

5. The apparatus defined in claim 2 wherein said quenching means includes a water trough disposed beneath said discharge end and provided with an inclined conveyor for withdrawing the quenched clinker from said trough and discharging said quenched clinker into a drying compartment.

6. The apparatus defined in claim 5 wherein said classifying means includes one shaft opening downwardly into said trough and at least one baffle for deflecting clinker cascading toward said trough whereby larger particles of clinker fall into deeper water within said trough.

7. The apparatus defined in claim 6 wherein said baffle is formed as a classifying grate through which clinker particles pass.

8. The apparatus defined in claim 7 wherein said classifying grate is inclined and a comminuting device for said clinker is provided at a large end of said classifying grate.

9. The apparatus defind in claim 5 wherein the height of the water level in said grate and the speed of said conveyor are controllable.

10. The apparatus defined in claim 8 wherein fine particles of clinker fall onto said conveyor at a location provided with nozzles for spraying said fine particles with water.

11. The apparatus defined in claim 4 wherein said discharge end of said rotary kiln diverges frustoconically over a length equal to substantially half to the full diameter of said rotary kiln.

12. The apparatus defined in claim 2 wherein said rotary kiln has an end wall provided with said main burner and at least one auxiliary burner supplied with up to one third of the total fuel required for burning said clinker.

* * * * *